(12) United States Patent
Sun et al.

(10) Patent No.: US 10,521,685 B2
(45) Date of Patent: Dec. 31, 2019

(54) AUGMENTED REALITY MARKER DE-DUPLICATION AND INSTANTIATION USING MARKER CREATION INFORMATION

(71) Applicant: International Business Machines Corporation, Armonk, NY (US)

(72) Inventors: Lin Sun, Cary, NC (US); Paul R. Bastide, Boxford, MA (US); Liam S. Harpur, Skerries (IE); Matthew E. Broomhall, Goffstown, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 15/991,066

(22) Filed: May 29, 2018

(65) Prior Publication Data
US 2019/0370590 A1    Dec. 5, 2019

(51) Int. Cl.
*G06T 19/00* (2011.01)
*G06K 9/32* (2006.01)
*G06K 9/00* (2006.01)
*G02B 27/01* (2006.01)

(52) U.S. Cl.
CPC ......... *G06K 9/3233* (2013.01); *G02B 27/017* (2013.01); *G06K 9/00671* (2013.01); *G06T 19/006* (2013.01)

(58) Field of Classification Search
CPC ............ G06K 9/3233; G06K 9/00671; G02B 27/017; G06T 19/006
See application file for complete search history.

(56) References Cited

U.S. PATENT DOCUMENTS

| | | |
|---|---|---|
| 2011/0221771 A1 | 9/2011 | Donald et al. |
| 2013/0169684 A1 | 7/2013 | Deffeyes et al. |
| 2014/0204117 A1 | 7/2014 | Kinnebrew et al. |
| 2016/0049013 A1 | 2/2016 | Bautista |
| 2016/0259608 A1 | 9/2016 | Bean et al. |

OTHER PUBLICATIONS

Tatzgern, "Dynamic Compact Visualizations for Augmented reality", IEEE, 2013. (Year: 2013).*

* cited by examiner

*Primary Examiner* — Nicholas R Wilson
(74) *Attorney, Agent, or Firm* — Garg Law Firm, PLLC; Rakesh Garg; Michael O'Keefe

(57) ABSTRACT

An object of interest in an augmented reality view within a display of an augmented reality device is identified. A location of the object of interest is determined. A plurality of markers related to the object of interest is received. Metadata information associated with each of the plurality of markers is received. The metadata includes an indication of a location of an author of the marker at a time of authorship of the marker. The location of each of the plurality of markers is determined based upon the metadata information. A distance measure between the location of each of the plurality of markers and the location of the object of interest is determined. The plurality of markers are de-duplicated to form a subset of the plurality of markers based upon the determined distance measures. The subset of markers are sent to the augmented reality device.

20 Claims, 6 Drawing Sheets

AUGMENTED REALITY MARKER DE-DUPLICATION AND INSTANTIATION USING MARKER CREATION INFORMATION

TECHNICAL FIELD

The present invention relates generally to a method, system, and computer program product for augmented reality marker de-duplication and instantiation. More particularly, the present invention relates to a method, system, and computer program product for augmented reality marker de-duplication and instantiation using marker creation information.

BACKGROUND

Augmented reality (AR) refers to the use of technology to superimpose computer-generated images, text, or other information over a user's real world view. Typically, the superimposed information provides further information about an object of interest within an augmented reality view of an augmented reality device. Examples of AR devices include wearable eyeglasses, smartphones, and other user devices having AR capabilities. In an example usage, a user may carry or wear an AR device around a city and view an object of interest, such as a landmark or restaurant, within an AR view of the AR device. The AR view may further include a tag, marker, or other visual indication that includes additional information about the object of interest such as comments or reviews from other users.

SUMMARY

The illustrative embodiments provide a method, system, and computer program product. An embodiment of a method for augmented reality marker de-duplication includes identifying an object of interest in an augmented reality view within a display of an augmented reality device. The embodiment further includes determining a location of the object of interest, and receiving a plurality of markers related to the object of interest. The embodiment further includes receiving metadata information associated with each of the plurality of markers. In the embodiment, the metadata includes an indication of a location of an author of the marker at a time of authorship of the marker. The embodiment further includes determining the location of each of the plurality of markers based upon the metadata information, and determines a distance measure between the location of each of the plurality of markers and the location of the object of interest. The embodiment further includes de-duplicating the plurality of markers to form a subset of the plurality of markers based upon the determined distance measures, and sending the subset of the plurality of markers to the augmented reality device.

In an embodiment, the augmented reality device is configured to present the subset of the tags/markers within an augmented reality view based upon the determined priorities. In an embodiment, the metadata information further includes at least one of a time of authorship of the tag/marker and identify of the author. In an embodiment, the metadata information is associated with an image received from the augmented reality device.

In an embodiment, de-duplicating the plurality of markers is further based upon natural language processing of each of the plurality of markers.

An embodiment further includes grouping the de-duplicated markers onto one or more layers.

In an embodiment, de-duplicating the plurality of markers further includes determining a priority for each of the plurality of markers based upon the determined distances, and determining the subset of the plurality of markers based upon the determined priorities.

In an embodiment, the augmented reality device is configured to present the subset of the tags/markers within an augmented reality view based upon the determined priorities. In an embodiment, the augmented reality device is further configured to displays a layer including the subset of the plurality of markers based upon a user preference.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
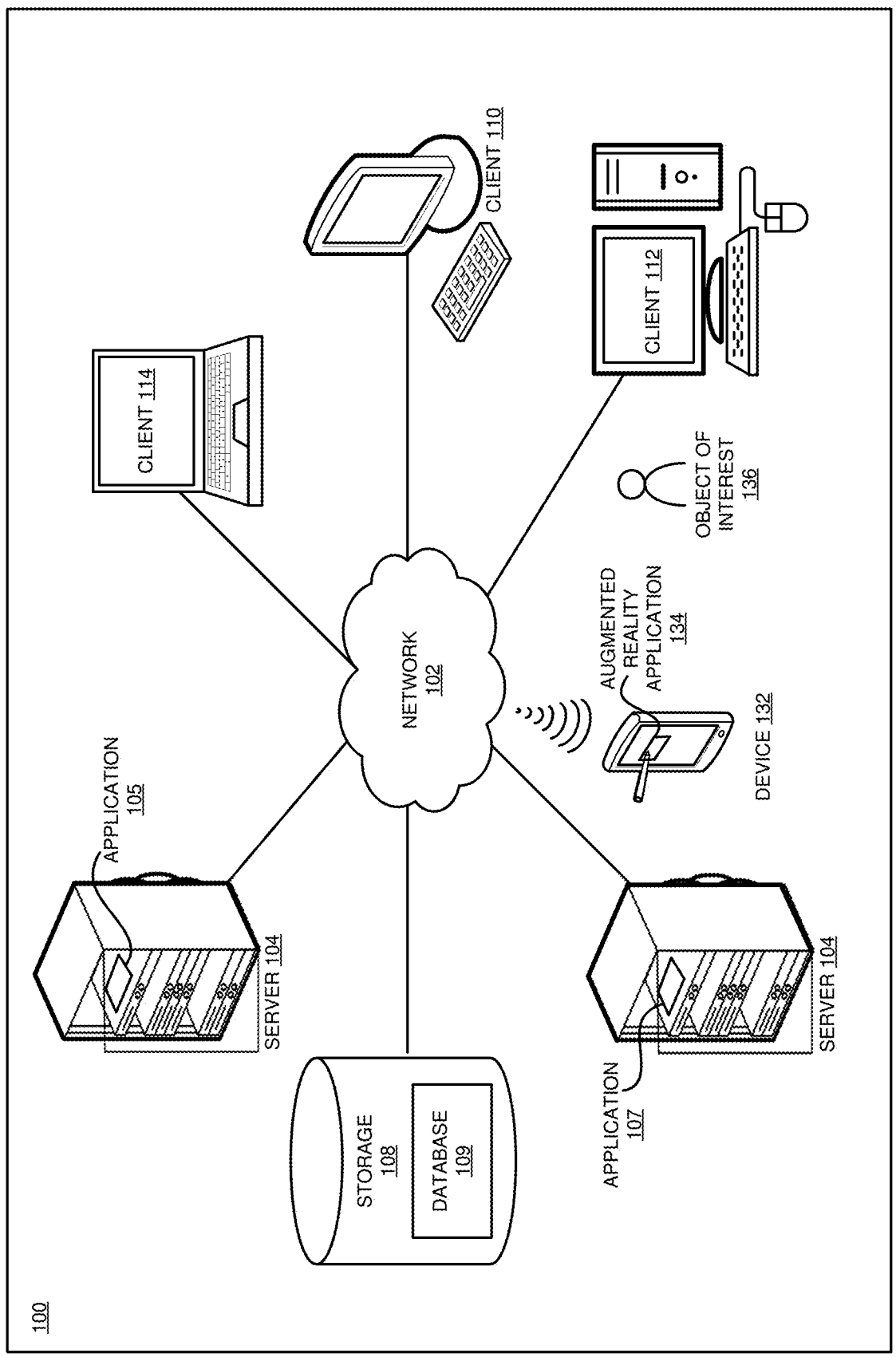
FIG. 1 depicts a block diagram of a network of data processing systems in which illustrative embodiments may be implemented.

Augmented reality (AR) devices, such as wearables and smartphones, are driving significant changes in user behaviors including new ways of sharing contact information, combining reality with games, and overlaying maps and map data with real world images. Many new opportunities to change user behaviors and user experiences through augmented reality are emerging. In augmented reality, live views are often combined with digital flags and markers to enable useful information to be presented to a user and/or acted upon by the user. Marker or tags include visual indications that are displayed in association with an object of interest in the real world image and often provide additional information about the object of interest.

As augmented reality applications continue to be integrated into devices such as smartphones and heads-up displays, a new attention management problem is arising—that of AR marker overload. For instance, augmented reality applications often present an overwhelming number of markers to users at the same time.

Markers may have been made by multiple users/organizations as well as by entities that are variable distances away from the actual tagged location/object or at various points in time. For example, a marker/tag including a comment/review of the Statue of Liberty may have been authored 1 km away while another marker/tag including a comment/review may have been authored 100 meters away. In another example, the same comment/review may have been made one year ago and another one week ago. However, both markers are anchored to the same point. The information in each tag/comment might best be consumed at that relevant physical location. The illustrative embodiments recognize that presently available methods for displaying markers/tags within augmented reality applications suffer from several disadvantages. The illustrative embodiments recognize that a clear need exists to optimize the number of markers in an augmented reality/virtual reality (VR) display such that there is de-duplication in a crowded AR/VR space and management of tags created variable distances away from tagged locations/objects.

The illustrative embodiments used to describe the invention generally address and solve the above-described problems and other problems related to augmented reality marker de-duplication and instantiation. Various embodiments describe a method, system, and computer program product for augmented reality marker de-duplication and instantiation using marker creation information.

One or more embodiments are directed to a system that de-duplicates AR tags and markers, groups the tags and markers into visual layers, and displays one or more of the visual layers within an AR display. In an embodiment, an AR application executing on a user device, such as AR glasses or a smartphone, identifies a location of the user device and an object of interest in an AR view of a display of the user device. In the embodiment, the system retrieves tags and markers related to the object of interest from one or more tag/marker sources such as trip planning services, search engines, review sites, proprietary AR databases, and social media sites.

In the embodiment, the system de-duplicates the tags and markers based on semantic analysis of the tags, the source of the tags/markers, a location of the author of the tag/marker at the time the tag/marker was created, and a creation date of the tag/marker. In the embodiment, the system groups the de-duplicated tags/markers onto one or more layers. In particular embodiments, the layers include, for example, an object of interest information layer, a social contacts layer, and a user experience layer. In the embodiment, the system causes the user device to display the layers in a rotating or cumulative priority order, such as the information layer, then the social contact layer, and then the user experience layer. In an alternative embodiment, layers are displayed based on a user input or user preference. In one or more embodiments, the number of tags and markers displayed per layer is determined by a predefined number or a user preference.

An embodiment optimizes augmented reality marker user engagement by detecting a crowded VR/AR space for a user, detecting semantic duplication of tags/markers information associated with a particular object of interest, mapping a probable author's location relative to the object of interest, mapping the most recent of a number of relevant comments to the object of interest. The embodiment further implements de-duplication of tags/marker information based at least partially on the aforementioned steps. The embodiment further adjusts a relative size of the markers/tags based on the marker population level of the space and the physical distance between the location of the author of the marker/tag from the location of the object of interest.

In an embodiment, a useful marker threshold may be pre-fixed by government, A/R administrator, location-based value, etc. In an embodiment, a useful marker may start from a Laplace-like smoothing by selecting a starting point as non-zero, and subsequently learning the threshold based on utilization and engagement. In an embodiment, a social layer is configured to capture tags/markers historically around the area or that have a similar characteristics/behavior.

In an example, an AR device or smartphone of a user tracks the user's movement. The user looks at the Statue of Liberty from 1 km away using the AR device. Currently existing systems provide multiple duplicated results from various reviewer sites and other tag/marker providers. In the example, the system detects an overcrowded VR/AR space around the user's AR device and not all of the tags/markers are likely relevant to the user's current location and/or situation. In the example, the system maps the author's location at the time of tag/marker creation relative to the location of the object of interest. In particular embodiments, the system maps the location of the object of interest to a potential maximum threshold of two tags/markers for the user.

In the example, the system prioritizes the tags/markers and uses a threshold to build one or more layers. The system de-duplicates the tags/markers based at least in part on the relative distance of the author's location during authoring of the tag/marker to the location of the object of interest. In the example, the system adjusts the relative size of the markers/tags based on the marker population level of the space and the relative distances and presents the markers/tags in the AR display. In the particular example, the adjusted markers/tags are grouped into a Layer 2 and the original markers/tags before de-duplication are grouped as a Layer 1. In the example, layer 2 is then presented within the AR view with less detail than layer 1.

In an embodiment, an application residing on a server determines a location of an author of a marker, Marker 1, at a time of authorship of the marker within an AR view of a user device and a location of the object of interest to which Marker 1 is associated. In one or more embodiments, the application obtains Marker 1 from one or more data sources, such as a social media data source, and obtains location information regarding authorship of Marker 1 using a GPS enabled activity monitor or a mapping application residing on a smartphone.

In the embodiment, the application parses the data source information to extract information regarding a location of an object of interest. In a particular embodiment, the application derives a location of the object of interest from a screen capture included in a social media post such as a Twitter™ post. In another embodiment, the application extracts the location information from location information embedded in a photograph or other image extracted from a social media post. In another embodiment, the application extracts probable location information of authorship of a marker or a probable location information of an object of interest from a social media post, such as a Facebook™ comment associated with a likely marker creation command, using natural language processing, semantic processing, or other cognitive processing techniques.

In a particular embodiment, the application determines the location of an author of a tag/marker by detecting activity of the author based upon calendar usage such as by parsing a calendar entry of "Lunch with Fred at @Marriot", and map to a location at that time. In another particular embodiment, the application detects a marker based upon a live streaming social media history of the author such as a live stream including a comment of "Biking with Jeff in Central Park".

In one or more embodiments, the application further determines priorities of a number of tags/markers and uses a predetermined threshold to group the markers into one or more layers. In an embodiment, the application receives continuous images captured by the AR device and instructs the AR device to selectively displays markers using selected probable creation locations as described herein along with an object of interest to which the markers are associated.

In an embodiment, the application counts a number of occurrences of a likely duplicate AR tag/marker to determine which AR tags/markers are to be de-duplicated. In one or more embodiments, the application may also use the frequency of occurrence of a specific object, not necessarily tied to a marker, determine which AR tags/markers are to be de-duplicated to ascertain the opportunity to use the creation point information to display markers associated with an object of interest.

In one or more embodiments, the application aggregates augmented reality markers from a number of data sources, such as TripAdvisor™ recommendations, Yelp™ recommendations, and LinkedIn™ Business Card details, and builds a layer set based on the creation locations of each of the sources.

An example layer set according to a particular embodiment includes:

Layer 1—Statue of Liberty [Max 2]
Layer 2—Social Contacts [Max 2]
Layer 3—Experience 1, Experience 2 [Max 2]

In an embodiment, the application prioritizes each of the layers in the set of layers and instructs the AR device to display the layers in a particular sequence or according to a user preference. In a particular embodiment, each layer is presented with a specific color. In another particular embodiment, the user may instruct the AR device rotate the layers within the AR view based on a gesture, haptic feedback or a specific touch type. In another particular embodiment, the layers are configured to rotate on a timed frequency interval, such as logarithmic interval 5 seconds for Layer 1 and 2.5 seconds for Layer 2. In particular embodiments, a group or cohort of users may vote to define a preferred order for presentation of the layers within the AR view.

One or more embodiments may provide one or more advantages of improving the utility of augmented reality makers, and improving user attention management for augmented reality markers.

An embodiment can be implemented as a software application. The application implementing an embodiment can be configured as a modification of an existing health status detection system, as a separate application that operates in conjunction with an existing health status detection system, a standalone application, or some combination thereof.

The illustrative embodiments are described with respect to certain types of augmented reality devices/displays, tags, markers, marker de-duplication and instantiation procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
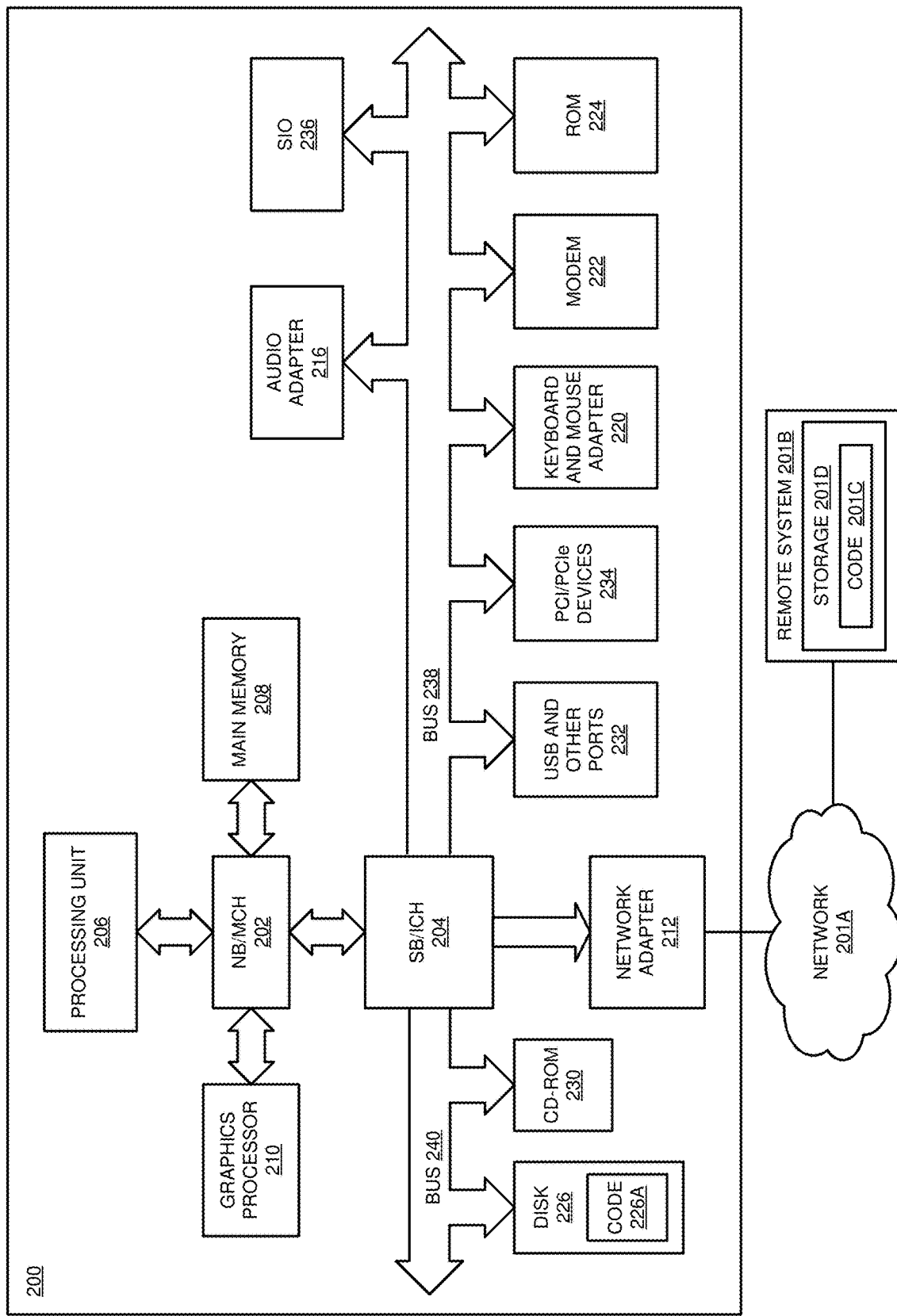
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of an augmented reality (AR) device described herein. For example, device 132 can take the form of a wearable AR device, a smartphone, a tablet computer, a laptop computer, client 110 in a stationary or a portable form, a wearable computing device, or any other suitable device. Device 132 includes an augmented reality (AR) application 134 configured to capture images of an object of interest 136 within an AR view and perform functions of AR application 134 described herein. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for augmented reality marker de-duplication and instantiation using marker creation information in accordance with one or more embodiments.

Server 106 includes an application 107 configured to retrieve AR tags and/or markers and related metadata information from one or more data sources as described herein with respect to various embodiments. Storage device 108 includes one or more databases 109 configured to store data such as AR tags/markers and associated metadata and/or user profile information.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/

PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
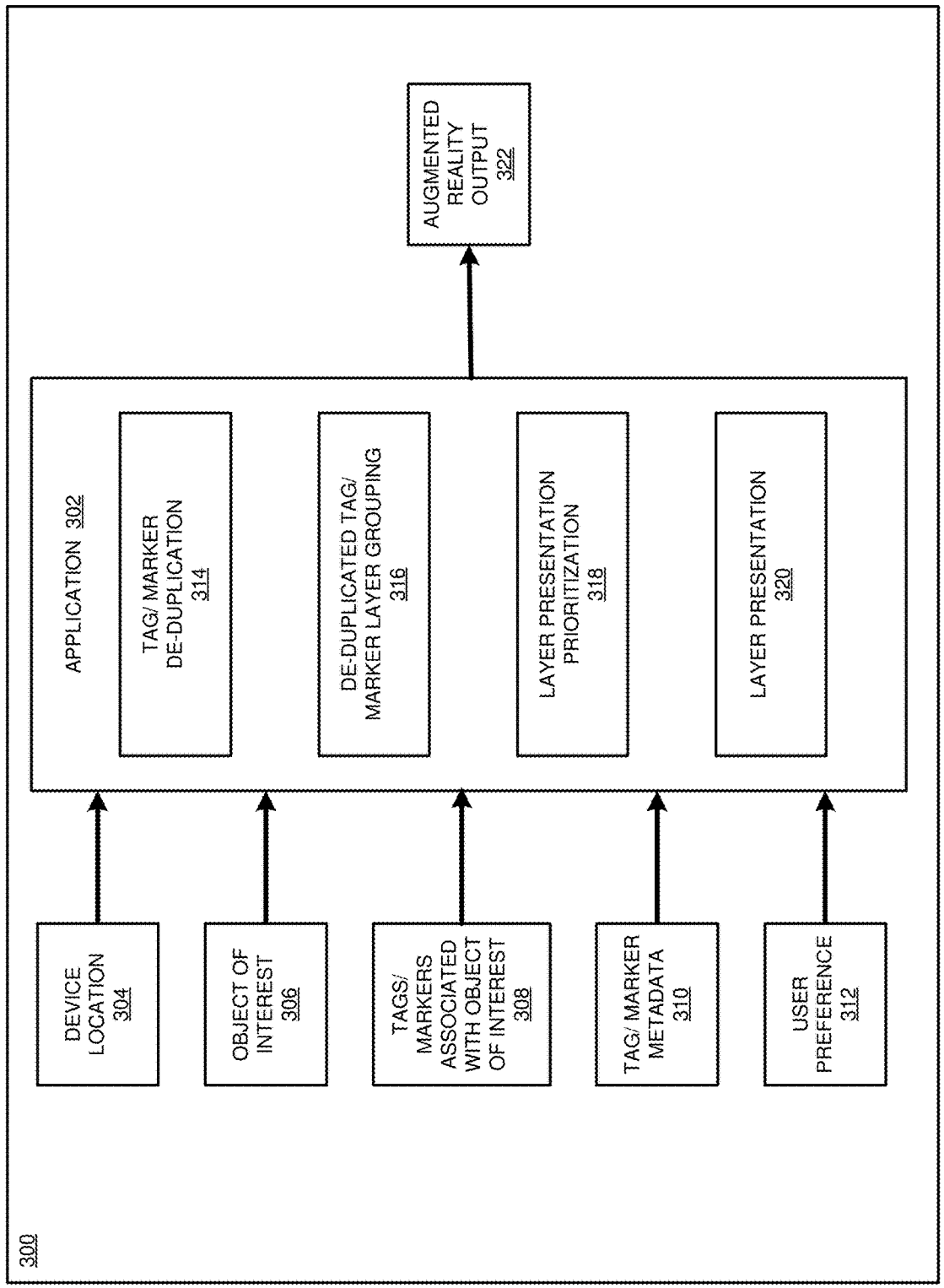
FIG. 3 depicts a block diagram of an example configuration for augmented reality marker de-duplication and instantiation using marker creation information in accordance with an illustrative embodiment.

With reference to FIG. 3, this figure depicts a block diagram of an example configuration 300 for augmented reality marker de-duplication and instantiation using marker creation information in accordance with an illustrative embodiment. The example embodiment includes an application 302. In a particular embodiment, application 302 is an example of application 105 of FIG. 1.

Application 302 is configured to receive a device location 304 from device 132 to identify a location of device 132, object of interest information 306 identifying an object of interest within an AR view of device 132, one or more tags/markers 308 associated with the object of interest from one or more data sources, tag/marker metadata 310 associated with each of the tags/markers, and user preference information 312. In one or more embodiments, tag/marker metadata 310 includes information descriptive of a particular tag/marker including an identify of an author of the tag/marker, a location of the author at the time of authorship of the tag/marker, and a time of authorship of the tag/marker. In one or more embodiments, user preference information 312 includes information indicative of a manner in which the tags/markers are to be displayed in am augmented reality output 322.

Application 302 includes a tag/marker de-duplication component 314, de-duplicated tag/marker layer grouping component 316, layer presentation prioritization component 318, and layer presentation component 320. Tag/marker de-duplication component 314 is configured to de-duplicate the tags and markers based on one or more of analysis of the tags, a source of the tags/markers, a location of the author of the tag/marker at the time the tag/marker was created, and a creation date and/or time of the tag/marker as described herein.

De-duplicated tag/marker layer grouping component 316 is configured group the de-duplicated tags/markers onto one or more layers. In particular embodiments, the layers include, for example, an object of interest information layer, a social contacts layer, and a user experience layer. Layer presentation prioritization component 318 is configured to prioritize the tags/markers based at least in part on the relative distance of the author's location during authoring of the tag/marker to the location of the object of interest. Layer presentation component 320 is configured to adjusts the relative size of the markers/tags based on the marker population level of the AR space and the relative distances and present the markers/tags in augmented reality output 322 for display in the AR display of device 132. In an embodiment, augmented reality output 322 causes device 132 to display the layers in a rotating or cumulative priority order, such as the information layer, then the social contact layer, and then the user experience layer. In an alternative embodiment, layers are displayed based on a user input or user preference 312. In one or more embodiments, the number of tags and markers displayed per layer is determined by a predefined number or user preference 312.

Figure 4:
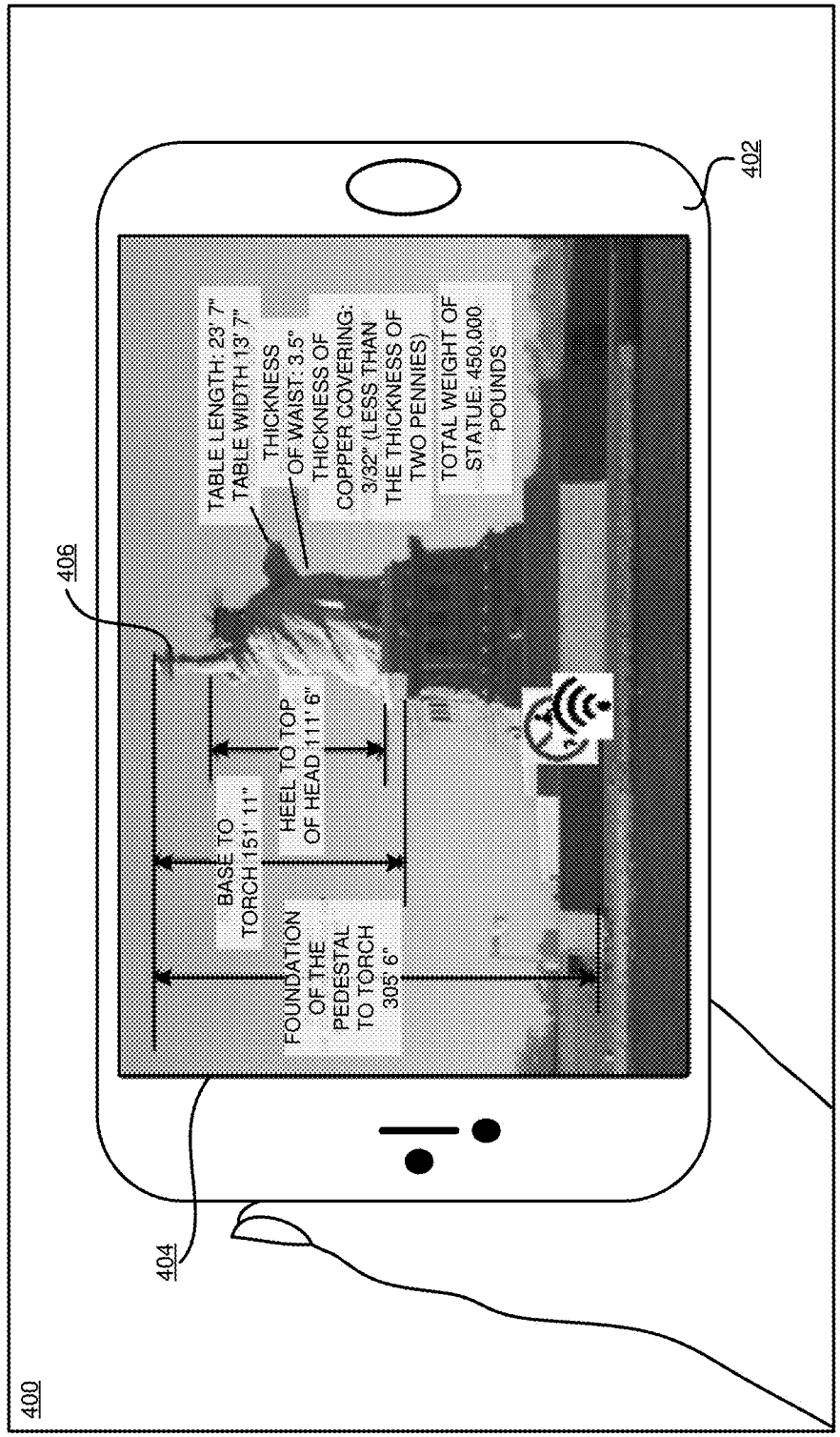
FIG. 4 depicts an example of an AR view of a user device in accordance with an illustrative embodiment.

With reference to FIG. 4, this figure depicts an example of an AR view 400 of a user device 402 in accordance with an illustrative embodiment. User device 402 includes a display 404 including an object of interest 406. In the particular example of FIG. 4, object of Interest 406 is the Statute of Liberty. Display 404 further includes a number of tags/markers shown in association with object of interest 406. In the particular example of FIG. 4, the tags/markers include indications of various dimensions of object of interest 406 and the availability of a Wi-Fi signal at the location of object of interest 406. As shown in FIG. 4, numerous tags/markers shown in display 404 may lead to difficulty in a user being able to view tags/markers that are desired to be viewed by the user. Accordingly, de-duplication and instantiation of tags/markers using tag/marker creation information as described herein with respect to various embodiments would be beneficial.

Figure 5:
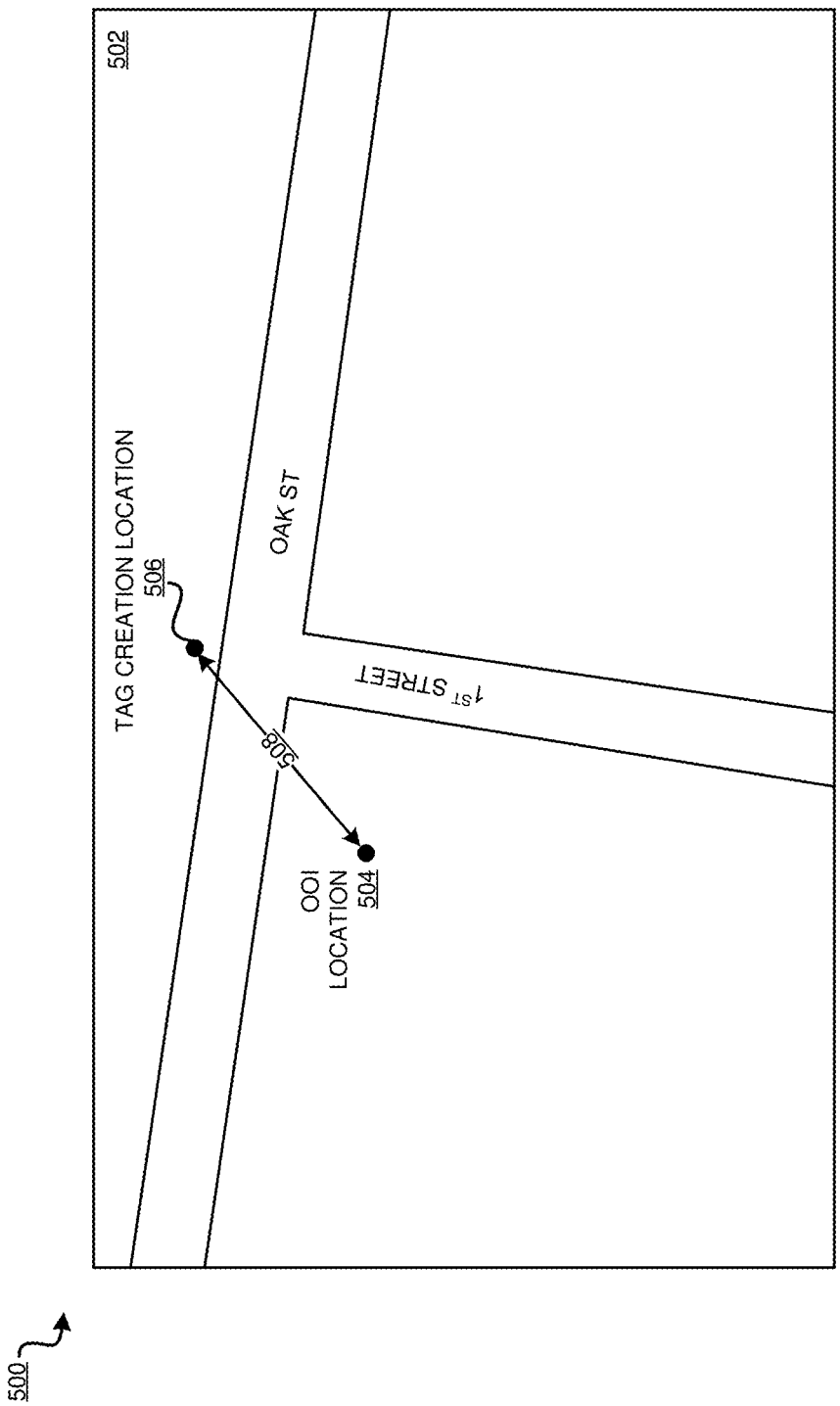
FIG. 5 depicts an example for determining of a distance between a tag creation location and an object of interest location in accordance with an illustrative embodiment.

With reference to FIG. 5, this figure depicts an example 500 for determining of a distance between a tag creation location and an object of interest location in accordance with an illustrative embodiment. Example 500 includes a map 502 in which an object of interest (OOI) location 504 is shown indicating a location within map 502 of an object of interest within an AR view. Map 502 further shows a tag creation location 506 indicating a location of an author at a time of creation of a tag including information descriptive of the object of Interest. Map 502 further shows a distance 506 between OOI location 504 and tag creation location 506 that may be used during to de-duplicate a number of tags within an AR view based upon distances between tag creation locations and an object of interest as described herein with respect to various embodiments.

Figure 6:
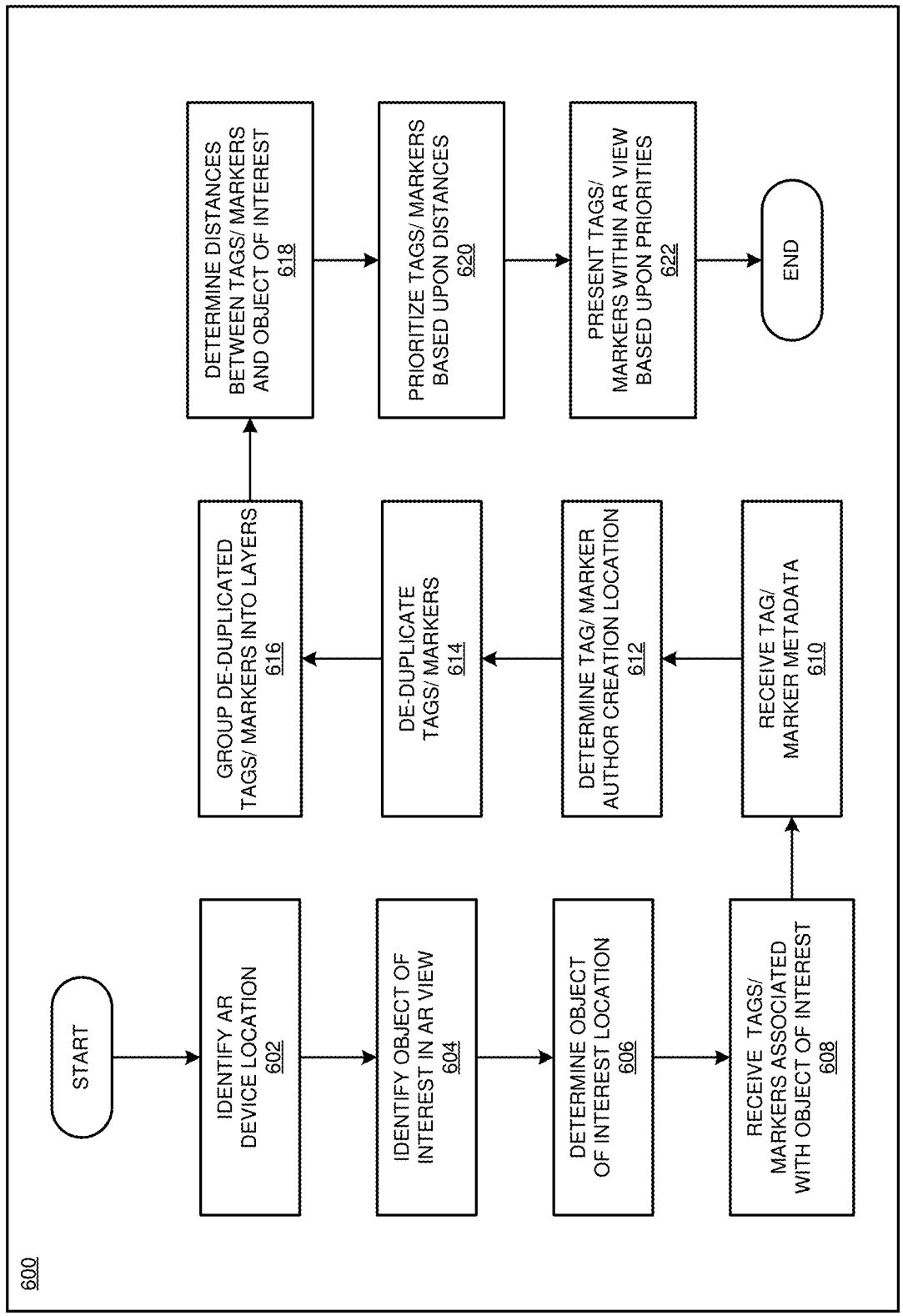
FIG. 6 depicts a flowchart of an example process for augmented reality marker de-duplication and instantiation using marker creation information in accordance with an embodiment.

With reference to FIG. 6, this figure depicts a flowchart of an example process 600 for augmented reality marker de-duplication and instantiation using marker creation information in accordance with an embodiment. In block 602, application 105 identifies a location of a user device such as an augmented reality (AR) device 132. In a particular embodiment, application 105 receives information indicative of the location of the AR device 132 from the AR device 132. In block 604, application 105 identifies an object of interest in an AR view of a display of AR device 132. In a particular embodiment, application 105 receives an identification of the object of interest from AR device 132. In block 606, application 105 determines a location of the object of interest. In an embodiment, application 105 receives the object of interest location from AR device 132. In another embodiment, application 105 receives the object of interest location from a data source.

In block 608, application 105 receives tags and markers related to the object of interest from one or more tag/marker sources such as trip planning services, search engines, review sites, proprietary AR databases, and social media sites. In block 610, application 105 receives metadata associated with each of the tags/markers. In one or more embodiments, the tag/marker metadata includes information indication of a location of the author of the tag/marker at the time of authorship of the tag/marker, and/or a time of authorship of the tag/marker. In other embodiments, the tag/marker metadata further includes information descriptive of a particular tag/marker including an identify of the author of the tag/marker. In block 612, application 105 determines the tag/marker author creation location based upon the metadata. In a particular embodiment, the tag/marker author creation location is determined from metadata associated with an image of an AR view received from AR device 132.

In block 614, application 105 de-duplicates the tags and markers based on one or more of a semantic analysis of the tags, the source of the tags/markers, the location of the author of the tag/marker at the time the tag/marker was created, and a creation date of the tag/marker. In block 616, application 105 groups the de-duplicated tags/markers onto one or more layers. In particular embodiments, the layers include, for example, an object of interest information layer, a social contacts layer, and a user experience layer. In block 618, application 105 determines distances between the location of each of the tags/markers and the location of the object of interest.

In block 620, application 105 prioritizes the tags/markers based upon the determined distances. In block 622, application 105 determines a subset of the tags/markers based upon the determined priorities and sends the subset of the tags/markers to AR device 132 for presenting the subset of the tags/markers within an AR view based upon the determined priorities.

In particular embodiments, AR device 132 displays layers including the subset of tags/markers in a rotating or cumulative priority order, such as the information layer, then the social contact layer, and then the user experience layer. In another embodiment, AR device 132 displays the layers based on a user input or user preference. In one or more embodiments, the number of tags and markers displayed per layer is determined by a predefined number or a user preference. Process 600 then ends.

Thus, a computer implemented method, system or apparatus, and computer program product are provided in the illustrative embodiments for augmented reality marker de-duplication and instantiation using marker creation information and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for augmented reality marker de-duplication, comprising:
   identifying an object of interest in an augmented reality view within a display of an augmented reality device;
   determining a location of the object of interest; receiving a plurality of markers related to the object of interest;
   receiving metadata information associated with each of the plurality of markers, the metadata including an indication of a location of an author of the marker at a time of authorship of the marker;
   determining the location of each of the plurality of markers based upon the metadata information;
   determining a distance measure between the location of each of the plurality of markers and the location of the object of interest;
   de-duplicating the plurality of markers to form a subset of the plurality of markers based upon the determined distance measures; and
   sending the subset of the plurality of markers to the augmented reality device.

2. The method of claim 1, wherein the augmented reality device is configured to present the subset of the tags/markers within an augmented reality view based upon the determined priorities.

3. The method of claim 1, wherein the metadata information further includes at least one of a time of authorship of the tag/marker and identify of the author.

4. The method of claim 1, wherein the metadata information is associated with an image received from the augmented reality device.

5. The method of claim 1, wherein de-duplicating the plurality of markers is further based upon natural language processing of each of the plurality of markers.

6. The method of claim 1, further comprising:
   grouping the de-duplicated markers onto one or more layers.

7. The method of claim 1, wherein de-duplicating the plurality of markers further includes:
   determining a priority for each of the plurality of markers based upon the determined distances; and
   determining the subset of the plurality of markers based upon the determined priorities.

8. The method of claim 7, wherein the augmented reality device is configured to present the subset of the tags/markers within an augmented reality view based upon the determined priorities.

9. The method of claim 8, wherein the augmented reality device is further configured to displays a layer including the subset of the plurality of markers based upon a user preference.

10. A computer usable program product comprising one or more computer-readable storage devices, and program instructions stored on at least one of the one or more storage devices, the stored program instructions comprising:
    program instructions to identify an object of interest in an augmented reality view within a display of an augmented reality device;
    program instructions to determine a location of the object of interest;
    program instructions to receive a plurality of markers related to the object of interest;
    program instructions to receive metadata information associated with each of the plurality of markers, the metadata including an indication of a location of an author of the marker at a time of authorship of the marker;
    program instructions to determine the location of each of the plurality of markers based upon the metadata information;
    program instructions to determine a distance measure between the location of each of the plurality of markers and the location of the object of interest;
    program instructions to de-duplicate the plurality of markers to form a subset of the plurality of markers based upon the determined distance measures; and
    program instructions to send the subset of the plurality of markers to the augmented reality device.

11. The computer usable program product of claim 10, wherein the augmented reality device is configured to present the subset of the tags/markers within an augmented reality view based upon the determined priorities.

12. The computer usable program product of claim 10, wherein the metadata information further includes at least one of a time of authorship of the tag/marker and identify of the author.

13. The computer usable program product of claim 10, wherein the metadata information is associated with an image received from the augmented reality device.

14. The computer usable program product of claim 10, wherein de-duplicating the plurality of markers is further based upon natural language processing of each of the plurality of markers.

15. The computer usable program product of claim 10, further comprising:
    program instructions to group the de-duplicated markers onto one or more layers.

16. The computer usable program product of claim 10, wherein the program instructions to de-duplicate the plurality of markers further includes:
    program instructions to determine a priority for each of the plurality of markers based upon the determined distances; and
    program instructions to determine the subset of the plurality of markers based upon the determined priorities.

17. The computer usable program product of claim 16, wherein the augmented reality device is configured to present the subset of the tags/markers within an augmented reality view based upon the determined priorities.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to identify an object of interest in an augmented reality view within a display of an augmented reality device;
    program instructions to determine a location of the object of interest;

program instructions to receive a plurality of markers related to the object of interest;

program instructions to receive metadata information associated with each of the plurality of markers, the metadata including an indication of a location of an author of the marker at a time of authorship of the marker;

program instructions to determine the location of each of the plurality of markers based upon the metadata information;

program instructions to determine a distance measure between the location of each of the plurality of markers and the location of the object of interest;

program instructions to de-duplicate the plurality of markers to form a subset of the plurality of markers based upon the determined distance measures; and program instructions to send the subset of the plurality of markers to the augmented reality device.

* * * * *